United States Patent [19]
Tittelbach

[11] 3,847,374
[45] Nov. 12, 1974

[54] DISASSEMBLABLE VALVE

[76] Inventor: Herbert Tittelbach, 32 Hauptstr., D-4307 Kettwig/Ruhr, Germany

[22] Filed: Feb. 6, 1973

[21] Appl. No.: 330,066

[30] Foreign Application Priority Data
Feb. 7, 1972   Germany............................ 2205620

[52] U.S. Cl.................. 251/367, 285/156, 137/269
[51] Int. Cl.............................................. F16k 1/04
[58] Field of Search................... 251/367, 366, 361; 137/269, 270; 248/58, 62, 68; 85/1; 285/31, 363, 405, 156, 180, 181, 182

[56] References Cited
UNITED STATES PATENTS

| | | | |
|---|---|---|---|
| 1,258,903 | 3/1918 | Howard | 251/361 X |
| 1,395,018 | 10/1921 | Soderstrom | 251/367 X |
| 1,438,601 | 12/1922 | Kempton | 403/44 |
| 1,481,663 | 1/1924 | Davis | 251/367 X |
| 1,671,789 | 5/1928 | Smith | 285/156 X |
| 2,083,966 | 6/1937 | Stitzer | 251/367 X |
| 2,225,838 | 12/1940 | Miller | 277/65 |
| 2,479,612 | 8/1949 | Glidden | 285/363 X |
| 2,481,214 | 9/1949 | Harper | 251/367 X |
| 3,052,444 | 9/1962 | Kintner | 251/367 X |
| 3,202,170 | 8/1965 | Holbrook | 137/269 |
| 3,315,702 | 4/1967 | Passazzio | 251/367 X |
| 3,367,624 | 2/1968 | Scaramucci | 251/315 X |

FOREIGN PATENTS OR APPLICATIONS
288,845   4/1928   Great Britain...................... 251/367

*Primary Examiner*—Henry T. Klinksiek
*Attorney, Agent, or Firm*—Spencer & Kaye

[57] ABSTRACT

A dismountable valve assembly having a valve body made up of separately prefabricated tubular portions, a spacer plate containing a valve seat situated between each pair of adjacent tubular portions, cover elements covering either end of the valve, fastening bolts releasably fastening the tubular portions, their associated spacer plates and the cover elements, and a valve stem, carrying a valve disc. The valve stem extends through one of the adjacent tubular portions and is movably mounted so that its valve disc may alternately engage and disengage the valve seat of the spacer plate with which it is associated.

11 Claims, 6 Drawing Figures

DISASSEMBLABLE VALVE

BACKGROUND OF THE INVENTION

The present invention relates to a valve of the type having a valve body with an inlet and outlet portion, a valve seat disposed in the valve body and a valve bonnet which is releasably fastened to a valve body and to which is attached a valve stem which sealingly passes through the valve bonnet. The valve stem in turn supports a valve disc or the like which engages with the vavle seat inside the valve body.

SUMMARY OF THE INVENTION

It is an object of the present invention to provide a valve assembly which can be readily disassembled.

This, as well as other objects of the invention, are achieved by the provision of a valve body composed of separately prefabricated tubular portions with a spacer plate containing a valve seat situated between adjacent tubular portions, a cover element situated at each end of the valve, fastening bolts releasably fastening the tubular portions, their associated spacer plates and the cover elements and a valve stem mounted to extend through one of the tubular portions for reciprocal movement relative thereto, so that a valve disc, which is mounted on the valve stem, may alternately engage and disengage the valve seat of the spacer plate between the adjacent tubular portions.

More particularly, the dismountable valve assembly according to the present invention has a valve body which is composed of at least two separately prefabricated tubular portions each having an access sleeve defining a path into the interior of its tubular portion, a spacer plate disposed between adjacent tubular portions and having a valve seat and, according to one embodiment of the invention, a base plate at one end of the assembled valve and the valve bonnet at the other end of the assembled valve, with all of the spearate parts being releasably and tightly connected together by tension bolts.

With the valve assembly of the present invention, it is now possible to independently exchange the valve seat, the valve bonnet with its setting device and/or the tubular portions bearing access sleeves with other parts having different dimensions and/or different configurations, which results, inter alia, in a substantial simplification in the production and supply of valves.

In an advantageous and inventive embodiment of the present invention, all tubular portions, the spacer plates and the base plate are arranged to be rotatable and fixable with respect to one another and to the valve bonnet, about an axis whch is coaxial to the axis of the valve stem. This has the advantage that the position of the access sleeves can now be selectively varied at the location where the valve is used, which substantially simplifies installation. Thus it is now possible to arrange the connecting seleves, for example, to be aligned with one another, to be opposite one another and also at any desired angle to one another.

In a preferred and inventive embodiment of the present invention, the tubular portions, the spacer plates, the base plate and the valve bonnet are provided with annular plug-in connectors in the form of tongues and grooves. Preferably, the tubular portions end in conically tapered edge portions which form the tongues. These conically tapered edge portions are formed at the frontal sides of the tubular portions facing the spacer plates, the base plate and the valve bonnet. The grooves are correspondingly profiled to receive the tongues. The grooves are provided in the spacer plates and the base plate.

It has been found to be particularly advantageous for all spacer plates and the base plate to be profiled annular grooves in both oppositely facing sides, the grooves being coaxial with one another and profiled to correspond to the tongue portions of the tubular portions.

An advantageous and inventive feature of the present invention is that the tubular portions are designed as tubular T-shaped pieces where the radially extending access sleeves may have a diameter different from that of the coaxially arranged openings. This makes it possible, inter alia, to weld the connecting lines directly to the radially extending access sleeves of the tubular T-shaped pieces.

It is of course also possible to provide the radially extending access sleeves of the tubular T-shaped pieces with flanges or similar connecting elements.

In a further advantageous and inventive embodiment of the present invention, the tension bolts which are distributed around the periphery of the valve are bolts which are provided with nuts and preferably the tension bolts pass through all spacer plates, the base plate and the valve bonnet.

In this connection, an advantageous particularity of the above-described feature is that certain of the tension bolts are provided with annular zones which enclose an access sleeve, with each annular zone and its enclosed access sleeve defining in assembly a clearance space.

This has the advantage that tension bolts can also be provided in the areas of the access sleeves.

To further increase the possibility for variations for the above-described invention, an advantageous feature is characterized in that the base plate is provided with at least one connecting sleeve or the like.

DESCRIPTION OF THE PREFERRED EMBODIMENTS

Figure 1:
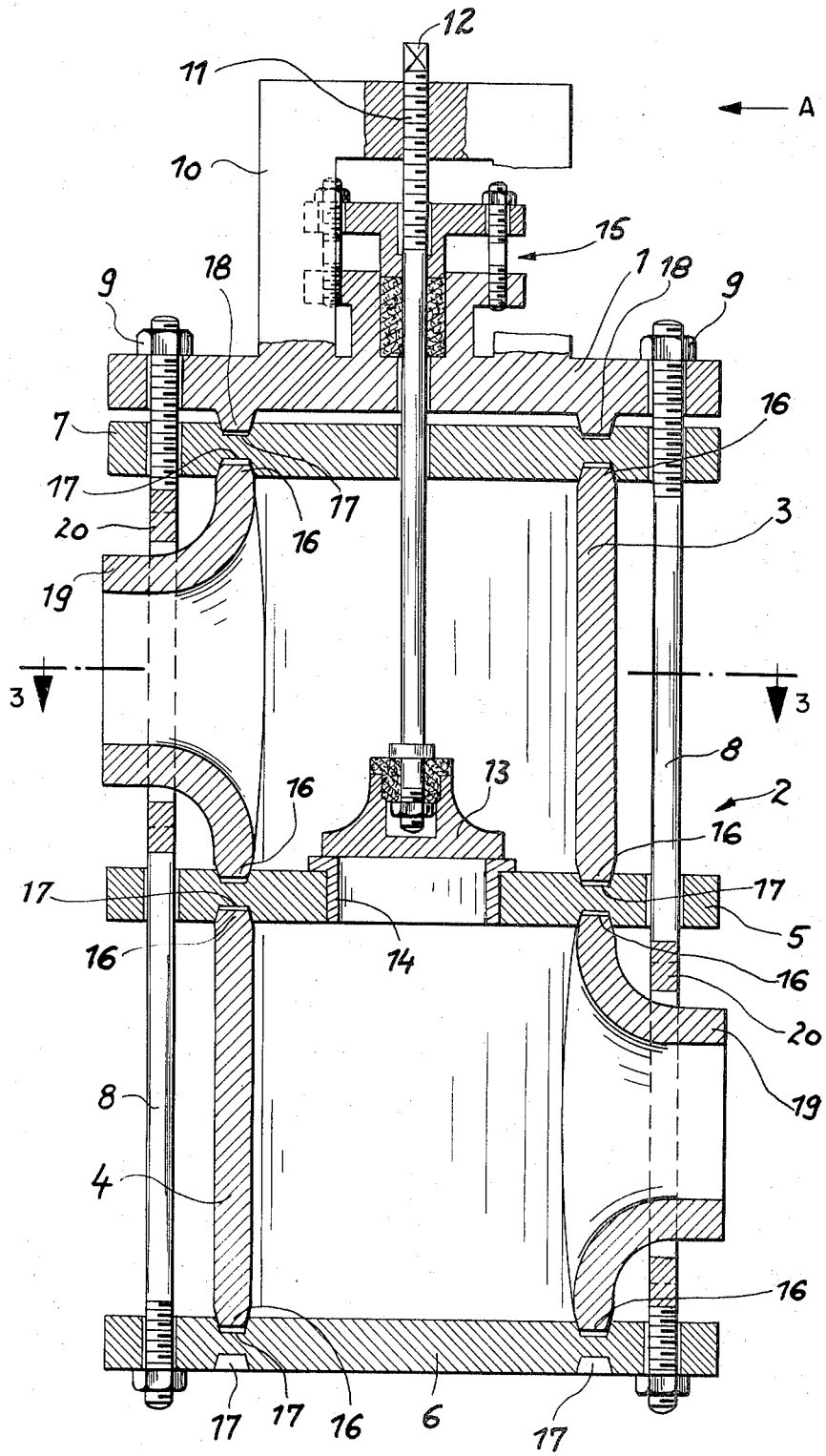
FIG. 1 is an elevational view partly in cross section of one arrangement of a valve according to the present invention.
Figure 2:
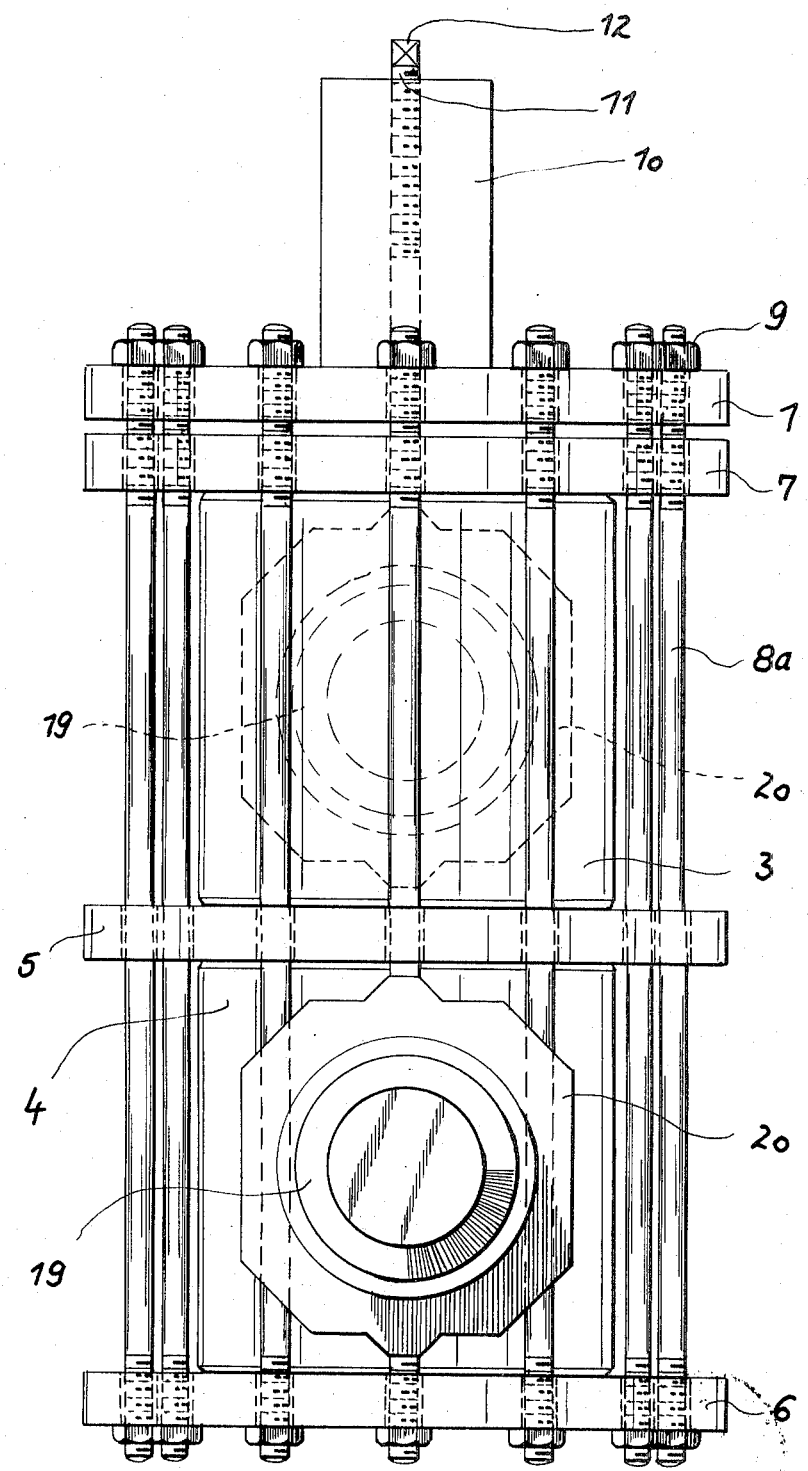
FIG. 2 is a side view of the valve arrangement of FIG. 1 seen in the direction of the arrow A of FIG. 1.
Figure 3:
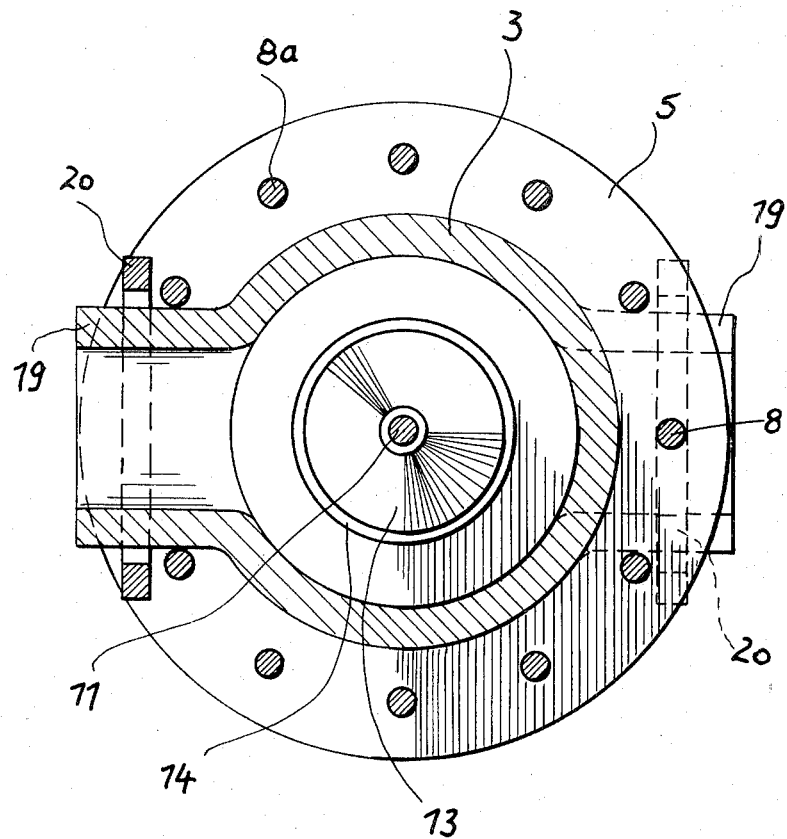
FIG. 3 is a cross-sectional view taken along the line 3—3 of FIG. 1.

In the valve assembly shown in FIGS. 1, 2 and 3, a valve bonnet 1 is releasably bolted to a housing 2 which is a combination of two housing portions 3 and 4 designed as seamless tubular T-shaped pieces, a spacer plate 5 disposed therebetween, a base plate 6 and a cover plate 7. Twelve tension bolts are further provided which are distributed around the periphery of the valve and are represented by bolts 8 and 8a with nuts 9. The bolts pass through the housing portions 5, 6 and 7 and the valve bonnet 1 and hold elements 1 and 3–7 releasably together.

A valve stem in the form of a screw drive 11 is displaceably mounted in a hood portion 10 of the valve bonnet 1. The upper end of the valve stem 11 is provided with a multifaceted tang 12 for connecting a control wheel or the like. The stem 11 passes through aligned holes in the valve bonnet 1 and in the cover plate 7 and is provided at its lower end portion with an interchangeably fastened valve disc 13. An interchangeable valve seat 14 is arranged opposite the valve disc 13 within the spacer plate 5. The valve bonnet 1 is also provided with a packing bushing assembly 15 for sealing the passage for stem 11. Instead of the packing bushing assembly 15 other known seals can also be provided for example, a membrane seal.

In order to produce pressure-tight connections between the housing portions 3 to 7, on the one hand, and the housing 2 and the valve bonnet 1 on the other hand, tubular portions 3 and 4 are provided wth conically tapered opening edge portions or tongues 16 at their frontal sides facing the plates 5, 6 and 7. The plates 5, 6 and 7 have correspondingly profiled annular grooves 17.

The valve bonnet 1 is also provided with an annular ridge or tongue 18 on its side facing the plate 7 which is profiled and dimensioned to correspond with the tongues 16. The tongue 18 fits within an annular groove 17 in the plate 7.

Under certain circumstances it may be advantageous to provide sealing means in the annular grooves 17.

Each of the tubular portions 3 and 4 is provided with a radially extending sleeve 19 which provides a fluid flow path to the interior of its respective tubular portion.

In order to be able to also provide the bolts 8 in the areas of the radially extending sleeves 19 of the housing portions 3 and 4, the bolts 8 are provided with annular components 20 which surround the sleeves 19. Each of the annular components is dimensioned to present a clearance space around its associated sleeve 19.

Figure 4:
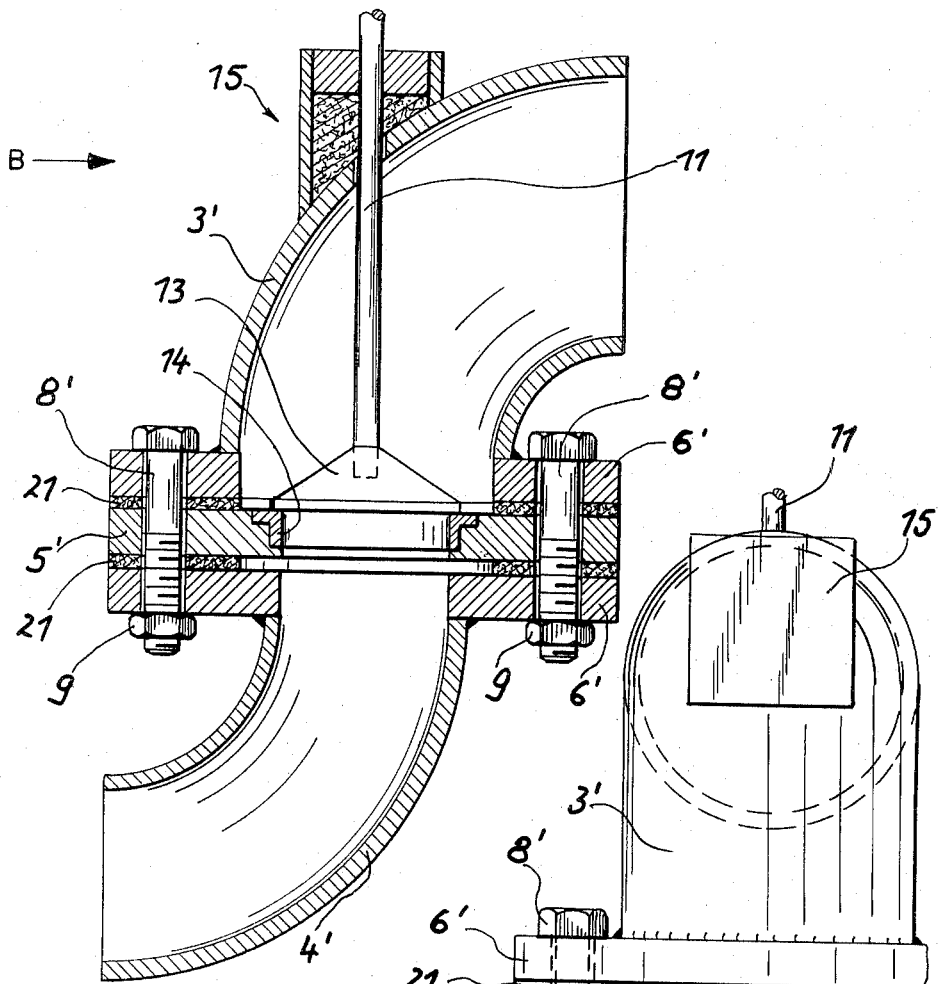
FIG. 4 is an elevational view partly in cross section of another arrangement of a valve according to the present invention.
Figure 5:
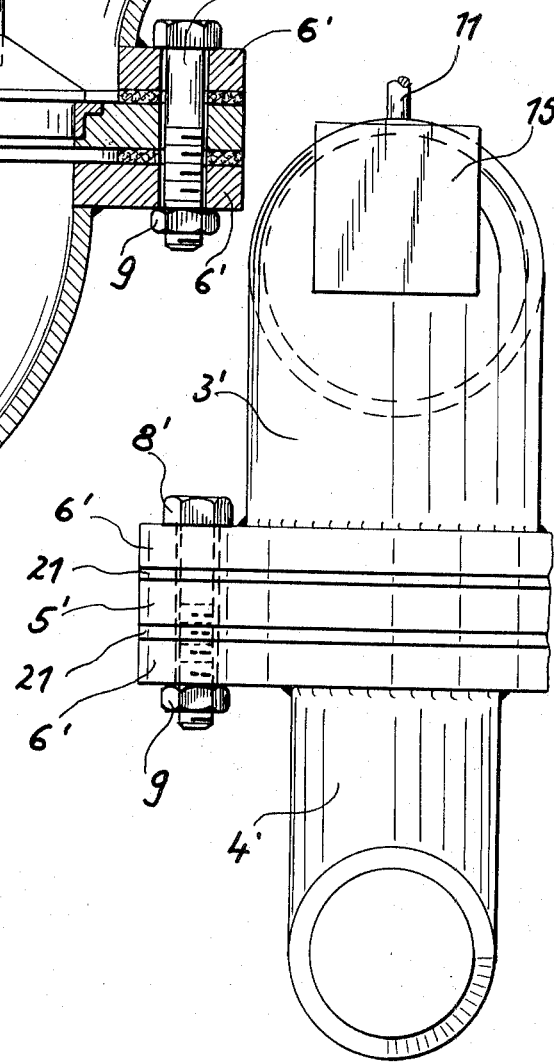
FIG. 5 is a side view of the valve arrangement of FIG. 4, seen in the direction of the arrow B of FIG. 4.

In the valve shown in FIGS. 4 and 5 two housing portions in the form of elbows 3' and 4', respectively, are fastened to the spacer plate 5' provided with a valve seat 14 by tension bolts which are provided in the form of hexagonal head bolts 8' with hexagonal nuts 9. These bolts pass through aligned holes in the spacer plate 5' and base plates in the form of flanges 6' welded to the elbows 3' and 4', respectively.

Annular gaskets 21 are clamped between the flanges 6' and the spacer plate 5'.

Opposite the valve seat 14 a valve plate 13 is provided which is supported by the valve stem 11. The valve stem 11 passes through a hole in the elbow 3' and is sealed by means of a packing bushing 15.

Figure 6:
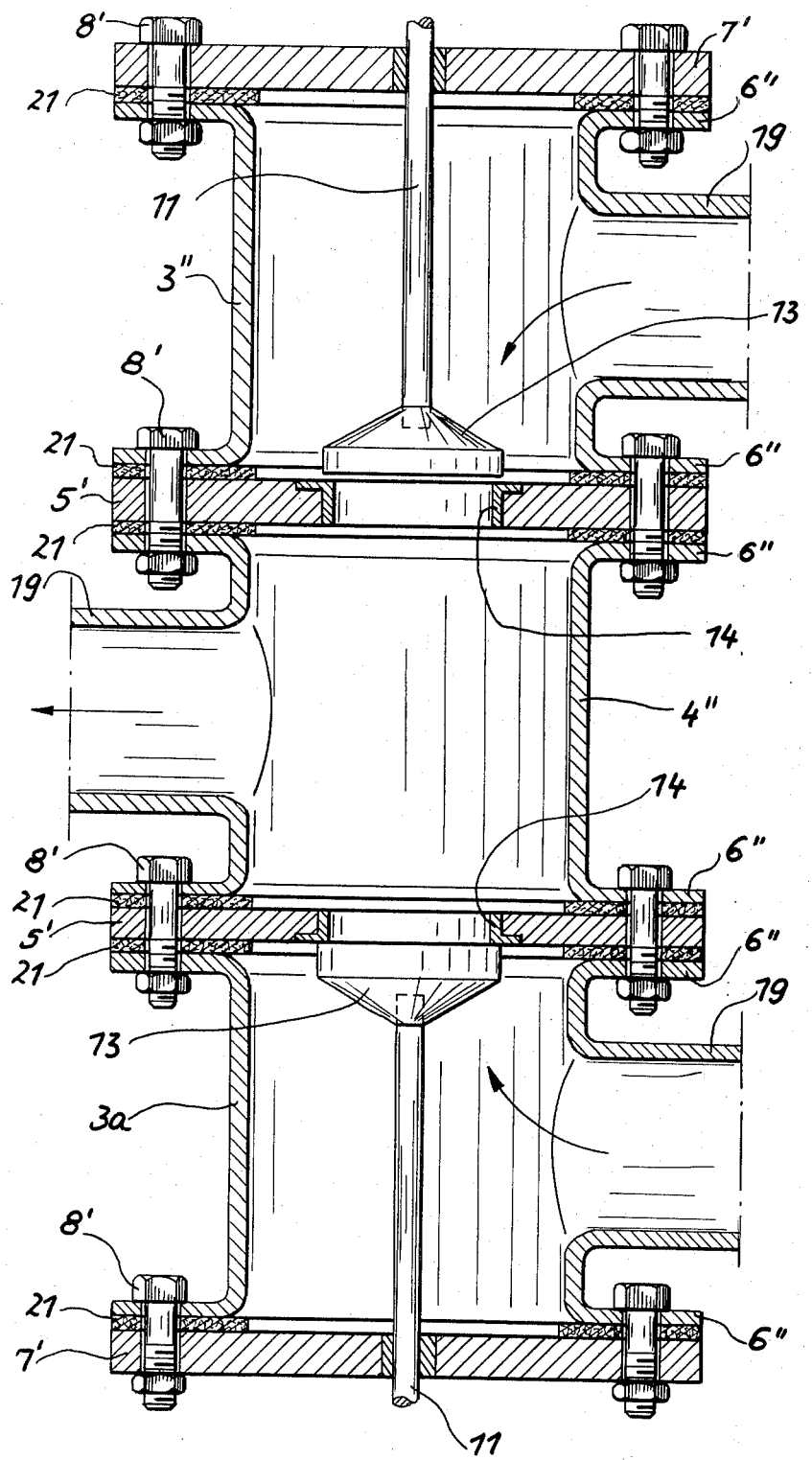
FIG. 6 is a view partly in cross section of a mixing valve according to the present invention.

FIG. 6 illustrates a mixing valve arrangement according to the present invention. The mixing valve includes three seamless tubular T-shaped portions 3", 3a and 4", each with an access sleeve 19. Each tubular portion is moreover provided with flanges 6". A spacer plate 5j' is releasably fastened by means of bolts 8', 9 between the tubular portions 3", 3a and 4". The tubular portions 3" and 3a are in turn provided with bonnets, or housing covers 7', to which a valve stem 11 is mounted. Each cover 7' can be provided with a stem support structure of the type shown in FIG. 1. The valve stems 11 sealingly pass to the outside of the mixing valve through corresponding holes in the cover plates 7'.

The spacer plates 5' are, as before, provided with a valve seat 14, while the valve stems are provided with engaging valve discs 13.

Here, as in the embodiment of FIGS. 4 and 5, annular seals or gaskets 21 are provided between the sealing surfaces.

It will be understood that the above description of the present invention is susceptible to various modifications, changes and adaptations, and the same are intended to be comprehended within the meaning and range of equivalents of the appended claims.

I claim:

1. A disassemblable valve assembly, comprising:
   a. a housing including
      1. at least two separately prefabricated tubular portions each defining a fluid flow passage and each having a pair of opposed, flangeless, conically tapered opening edge portions defining tongues, at least one of said portions being a T-shaped portion having an access sleeve located between said edge portions and defining a flow path into the interior of said T-shaped portion,
      2. a spacer plate disposed between said tubular portions, said spacer plate having a valve seat formed therein and defining a fluid passage between said tubular portions,
      3. a base plate supporting at least one of said tubular portions; and
      4. said spacer plate and said base plate being formed with annular grooves on the sides thereof facing said tongues, said grooves and tongues having corresponding profiles;
   b. bolt means releasably fastening together said tubular portions, said spacer plate and said base plate with each said groove receiving and forming a fluid-tight seal with, a respective tongue, at least one of said bolt means comprising an annular member enclosing said access sleeve, said annular member and said sleeve defining in assembly a clearance space; and
   c. a valve stem mounted to extend in a sealing manner into one of said tubular portions, said valve stem including a valve disc engageable with said valve seat of said spacer plate.

2. A valve assembly as defined in claim 1, wherein said tubular portions have the form of tees.

3. A valve assembly as defined in claim 1, wherein said spacer plate and said base plate are provided with openings through which said bolts pass.

4. A valve assembly as defined in claim 1, wherein said base plate is at one end of said housing and further comprising a cover plate and bonnet at the other end of said housing adjacent one edge portion of one said tubular portion, said valve stem being mounted to said bonnet, and an annular groove is formed in said cover plate on the side facing its adjacent tubular portion, said groove having a profile corresponding to that of said tongue at said adjacent tubular portion edge portion and forming a seal therewith.

5. A valve assembly as defined in claim 4, wherein said spacer plate, said base plate and said cover plate have their annular grooves coaxially arranged and on both oppositely directed sides thereof the grooves on each plate having mirror image profiles.

6. A disassemblable valve assembly, comprising:

a. a housing including
  1. at least two separately prefabricated tubular T-shaped pieces each defining a fluid flow passage and each having a pair of opposed, flangeless, conically tapered opening edge portions forming tongues, and an access sleeve located between said edge portions and defining a flow path into the interior of its respective tubular piece,
  2. a spacer plate disposed between said tubular pieces adjacent one edge portion of each said piece, and two further plates each disposed adjacent the other edge portion of a respective one of said tubular pieces each surface of each said plate, which faces a respective tubular piece edge portion being provided with an annular groove located to mate with a respective tongue and having a profile corresponding to that of its associated tongue, each side plate having a plurality of bolt-receiving openings, and said spacer plate having a valve seat therein defining a fluid passage between the interiors of said tubular pieces; and
b. bolt means passing through said openings and releasably fastening together said tubular pieces and said plates with each said tubular piece interposed between said spacer plate and a respective one of said further plates and with each said tongue in mating engagement with a respective groove to form a fluid-tight seal between each said tubular piece end portion and its adjacent plate.

7. A valve assembly as defined in claim 6, wherein certain of said bolt means comprises annular members, each of which encloses an access sleeve, each said annular member and its enclosed access sleeve defining in assembly a clearance space.

8. A valve assembly as defined claim 6, wherein said bolt means comprise assemblies of bolts and nuts which are in threaded engagement to press together the members which they fasten, said assemblies being distributed around the periphery of said housing.

9. A valve assembly as defined in claim 6 further comprising a valve stem mounted to extend in a sealing manner into one of said tubular portions, said valve stem including a valve disc engageable with said valve seat.

10. A valve assembly as defined in claim 9, wherein said tubular portions, pieces and said plates are arranged to be rotatable, and fixable, with respect to one another about an axis coaxial to the axis of said valve stem.

11. A valve assembly defined in claim 9, wherein one of said further plates is at one end of said housing and further comprising a valve bonnet to which said valve stem is sealingly mounted at the other end of said housing.

* * * * *